United States Patent

Poettmann et al.

[15] 3,639,277

[45] Feb. 1, 1972

[54] HIGH WATER CONTENT MICELLAR DISPERSIONS USEFUL AS HYDRAULIC FLUIDS

[72] Inventors: Fred Poettmann; Stanley C. Jones, both of Littleton, Colo.

[73] Assignee: Marathon Oil Company, Findlay, Ohio

[22] Filed: Apr. 30, 1968

[21] Appl. No.: 725,488

[52] U.S. Cl. ................................................. 252/78, 252/75
[51] Int. Cl. ............................................................ C09k 3/02
[58] Field of Search ............................................. 252/75, 78

[56] References Cited

UNITED STATES PATENTS

| | | | |
|---|---|---|---|
| 3,117,929 | 1/1964 | McCoy et al. | 252/73 X |
| 3,278,442 | 10/1966 | Beerbower et al. | 252/75 |

*Primary Examiner*—Richard D. Lovering
*Attorney*—Joseph C. Herring, Richard C. Willson, Jr. and Jack L. Hummel

[57] ABSTRACT

An oil-external micellar dispersion exhibiting good fire-resistant properties and viscosity properties is obtained by the composition: (a) from about 71.5 to about 90 percent aqueous medium; (b) up to about 30 percent hydrocarbon; (c) at least about 4 percent of surfactant sufficient to impart micellar characteristics to "a" and "b" and, (d) from about 0.001 to about 20 percent cosurfactant. Extreme pressure agents, antifoam agents, corrosion and oxidation inhibitors, bactericides, scale inhibitors, added alkalinity, etc. can be incorporated within the composition.

12 Claims, No Drawings

HIGH WATER CONTENT MICELLAR DISPERSIONS USEFUL AS HYDRAULIC FLUIDS

BACKGROUND OF THE INVENTION

U.S. Pat. No. 3,117,929 to McCoy et al. teaches micellar lubricants containing up to 70 percent water dispersed in a hydrocarbon medium. McCoy et al. teach their micellar lubricants are useful as hydraulic fluids, metal working lubricants, and lubricants for internal combustion engines.

U.S. Pat. No. 3,105,050 to Fisher teaches aqueous hydraulic fluids containing at least 60 percent water, hydrocarbon, and an emulsifying agent. The emulsion can contain other agents to impart desired properties to the hydraulic fluid. These hydraulic fluids are water-external emulsions.

Applicants have discovered a novel composition having oil-external properties which contain from about 70 to about 90 percent water. These compositions are economical hydraulic fluids and can contain other additives to impart desired properties.

DESCRIPTION OF THE INVENTION

The hydraulic fluids of this invention are micellar dispersions. Water concentrations of from about 70 to about 90 percent are characteristic of these dispersions. The unexpected high water content of these dispersions is novel and is characteristic of a very economic and yet useful high water content hydraulic fluid.

The term micellar dispersion as used herein is meant to include micellar solution, microemulsion, transparent emulsion, and, in general, micellar systems taught within the prior art. The micellar dispersion is different from emulsions in many ways, the strongest differentiation being that the former are thermodynamically stable whereas the latter are not. Also, the micellar dispersions are generally transparent, whereas emulsions are not. Preferably, the dispersion is oil-external, i.e., the hydrocarbon component of the micellar dispersion is external to the aqueous component.

The micellar dispersion is composed essentially of hydrocarbon, an aqueous medium (e.g., water, brackish water and brine water) and surfactant sufficient to impart micellar characteristics to the dispersion. Preferably, cosurfactant and optionally electrolyte can be incorporated into the dispersions. Examples of volume amounts are from about 4 to about 30 percent hydrocarbon, from about 70 to about 90 percent aqueous medium, at least about 4 percent surfactant, from about 0.01 to about 20 percent or more of the cosurfactant and from about 0.001 to about 4 percent or more by weight of electrolyte.

Examples of hydrocarbon include crude oil, partially refined fractions of crude oil and refined fractions thereof. Specific examples include side cuts from crude oil columns, crude column overheads, straight run gasoline, and liquefied petroleum gases.

The hydrocarbon can also be a refined lubricating oil, or lubricating oil distillate. These types of hydrocarbon impart better lubricating properties than crude oil. Example of a lubricating oil is one having a gravity of about 24° API and a viscosity of about 226 SSU at 100° F. In addition, the hydrocarbon can be a mineral lubricating oil and can even be a synthetic either or ester-type lubricating oil. Paraffin based, naphthenic based, and mixed paraffin-naphthenic base mineral lubricating oils are useful. Mineral lubricating oils having a viscosity of about 50–1500 SSU at 100° F. are useful.

The aqueous medium is preferably soft water but the water can contain small amounts of salts as long as the salts are not detrimental to the equipment with which the dispersion comes in contact.

Surfactants useful with the dispersions include nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disuloacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAGE (a 30 percent active sodium lauryl sulfate marketed by DuPont Chemical Corporation, Wilmington, Del.), Energetic W-100 (a polyoxyethylene alkyl phenol marketed by Armour Chemical Company, Chicago, Ill.), Triton X-100 (an alkylphenoxy polyethoxy ethanol marketed by Rohm & Haas, Philadelphia, Pa.) and Arquad 12–50 (a 50 percent active dodecyl trimethyl ammonium chloride marketed by Armour Chemical Company, Chicago, Ill.), and like materials.

The surfactant can also be a petroleum sulfonate, also known as alkyl aryl naphthenic sulfonate, and preferably containing an alkali cation. Examples of preferred surfactants are the sodium and ammonium petroleum sulfonates having an average molecular weight of from about 360 to about 475, and more preferably from about 400 to about 450. The surfactant can be a mixture of low- and high-molecular-weight sulfonates or a mixture of two or more different surfactants.

The cosurfactants or cosolubilizers useful with the invention should be partially water soluble. Preferably, they have limited water solubility, e.g., from about 1 to about 5 percent at ambient temperature. Examples of cosurfactants include alcohols, amino compounds, esters, aldehydes and ketones containing from one up to about 20 or more carbon atoms and more preferably from about three to about 16 carbon atoms. The cosurfactant is preferably an alcohol, e.g., isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include the primary butanols, primary pentanols and primary and secondary hexanols. Concentrations of from about 0.01 to about 20 percent by volume of cosurfactant are useful in the micellar dispersion and more preferably from about 0.1 to about 5.0 percent. Mixtures of two or more cosurfactants are useful.

Examples of electrolytes useful within the oil-external micellar dispersions include inorganic bases, inorganic acids, inorganic salts, organic bases, organic acids, and organic salts which are strongly or weakly ionized. However, it is to be understood that electrolytes containing ions or causing a pH detrimental to metal parts in contact with the micellar dispersion should not be used. For example, electrolytes containing high-chloride content should not be used with stainless steel parts. But, acids such as oxalic acid can be used with iron-containing parts to reduce water insoluble iron oxides to water soluble iron oxides and thus remove scale. Examples of useful electrolytes include those found in U.S. Pat. No. 3,330,343, salts of chromates such as potassium dichromate, salts of phosphates and polyphosphates, etc. The type and concentration of electrolyte will depend also on the aqueous medium, surfactant, cosurfactant, hydrocarbon and the temperature at which the dispersions will be used. Generally from about 0.001 to about 4 percent or more by weight of electrolyte is useful. Micellar dispersions at high temperatures containing hydrophilic surfactants preferably use acids or salts whereas more oleophilic surfactants prefer electrolytes having a higher pH, e.g., NaOH. The electrolyte can be the salts within brine water.

The micellar dispersion can contain additives to impart desired properties for particular applications. For example, the dispersion can contain extreme pressure agents, antifoam agents, corrosion-inhibiting agents, oxidation-inhibiting agents, scale-inhibiting agents, bactericides, added alkalinity, etc. Examples of extreme pressure agents include tricresyl phosphate, chlorinated paraffin wax, sulfochlorinated olefin polymers. Examples of corrosion and scale inhibitors include compositions such as polyalkylene, polyamides of a long chain fatty acid. Ingredients such as sulfurized sperm oil, metal dithiocarbamates, polychloronaphtha alkyl xanthates, metal dithiophosphates, dibenzyl disulfides, and chlorinated waxes impart improved wear characteristics, etc., to the micellar dispersions. Oxidation inhibitors such as ditertiarylbutyl-paraponents within the micellar dispersion and different amounts thereof can be used to obtain stable oil-external micellar dispersions. Examples indicated in table I are prepared at room temperature with minimal agitation. The compositions of the micellar dispersions are indicated in table I:

TABLE I

| Sample | Surfactant | | Hydrocarbon | | Aqueous medium | | Cosurfactant | |
|---|---|---|---|---|---|---|---|---|
| | Percent | Type | Percent | Type | Percent | Type | ml.:100 ml. | Type |
| A | 5.2 | Ammonium petroleum sulfonate (average MW=440, 81% active). | 24.75 | Crude oil | 70 | 60% Henry plant water/ 40% Palestine water. | 0.08 / 0.25 | m-Amyl alcohol isopropanol. |
| B | 10 | "Pyronate 50" | 20 | do | 70 | do | 3.25 | n-Hexanol. |
| C | 10 | "Petronate L" | 20 | Straight-run gasoline | 70 | do | 4.24 | n-Amyl alcohol. |
| D | 20 | "Duponol WAQE" | 10 | do | 70 | Distilled water | 14 | l-Amyl alcohol. |
| E | 10 | "Energetic W-100" | 20 | do | 70 | do | 8.5 | Do. |
| F | 10 | "Triton X-100" | 20 | do | 70 | do | 5.5 | Do. |
| G | 20 | "Arquad 12-50" | 10 | do | 70 | do | 17.0 | Do. |
| H | 8.60 | Ammonium petroleum sulfonate. | 18.07 | Crude oil | 71.50 | Palestine water. | 1.77 / .06 | n-Amyl alcohol isopropanol. |
| I | 8.70 | do | 12.93 | do | 76.06 | do | 2.25 / .06 | Do. |
| J | 8.74 | do | 9.20 | do | 80.72 | 60% Palestine water/40% Henry plant water. | 0.89 / 0.45 | Do. |
| K | 10 | Ammonium petroleum sulfonate (avg. MW=440, 81% active). | 5 | do | 85 | do | 2.5 | n-Amyl alcohol. |

Legend: (1) Pyronate 50, a sodium petroleum sulfonate, average molecular weight 350, sold by Sonneborn Chemical Co., 300 Park Ave. S., New York, N.Y. 10010. (2) Petronate L, a sodium petroleum sulfonate, average molecular weight 422, sold by Sonneborn Chemical Co., 300 Park Ave. S., New York, N.Y. 10010 (3) Henry plant water is obtained from the Henry lease in Illinois; contains about 18,000 p.p.m. of dissolved salts and hereinafter is identified as Henry plant water. (4) Palestine water is obtained from the Palestine water reservoir in Palestine, Ill.; contains about 420 p.p.m. of dissolved salts and hereinafter is identified as Palestine water. The amount of cosurfactant is based on milliliter of cosurfactant per 100 ml. of liquid containing surfactant, hydrocarbon and aqueous medium.

cresol and phenyl-alpha-naphthylamine are examples of oxidation agents which are useful with these systems. Rust inhibitors such as amine salts of organic acids are useful. Antifoam agents include the common silicone polymers. In addition, dyes can be incorporated in the micellar dispersion to impart aesthetic value as well as fluid identification.

The hydraulic fluids of this invention exhibit good fire-resistant properties as well as viscosity properties. High viscosities, typically realized by water-in-oil emulsions, can be avoided by these systems—therefore, pumping problems due to high viscosities, e.g., cavitation in pumps, can be overcome by this invention. Sufficient amounts of cosurfactant and electrolytes can be incorporated within the micellar dispersion to adjust desired viscosities.

The hydrocarbon, surfactant, cosurfactant, and electrolyte in the micellar dispersion should not impart adversities to the operational characteristics of the dispersion with processing equipment. For example, electrolytes should not be used which are harmful to the particular metals of the processing equipment and aromatic hydrocarbon is preferably not used with parts which are soluble in this hydrocarbon. In addition, these micellar dispersion components should not be reactive with other components, including pump seals, within the system to cause corrosion, erosion, etc., or to produce side products which would impart adversities to the operational systems.

The following examples are presented to specifically illustrate dispersions useful with the invention. Unless otherwise specified, the percents are based on volume. These examples are not intended to limit in any way the invention. Rather, equivalents known in the art are intended to be within the scope of this invention as taught within the specification and appended claims.

EXAMPLE 1

This example is presented to show that different com-

What is claimed is:

1. An oil-external micellar dispersion useful as a hydraulic fluid, the dispersion comprised of (a) from about 71.5 to about 90 percent aqueous medium, (b) up to about 30 percent hydrocarbon, (c) at least about 4 percent of an anionic, cationic or nonionic surfactant sufficient to impart micellar characteristics to "a" and "b," and (d) from about 0.001 to about 20 percent cosurfactant containing one to about 20 carbon atoms and wherein the cosurfactant is selected from the group consisting of alcohols, ketones, aldehydes, esters, and amino compounds.

2. The micellar dispersion of claim 1 wherein the hydrocarbon is selected from the group consisting of crude oil, partially refined fractions of crude oil and refined fractions of crude oil.

3. The micellar dispersion of claim 1 wherein the hydrocarbon is a lubricating oil distillate.

4. The micellar dispersion of claim 1 wherein the surfactant is cationic.

5. The micellar dispersion of claim 1 wherein the surfactant is a petroleum sulfonate.

6. The micellar dispersion of claim 5 wherein the petroleum sulfonate has an average molecular weight within the range of from about 350 to about 475.

7. The micellar dispersion of claim 1 wherein the surfactant is nonionic.

8. The micellar dispersion of claim 1 wherein the cosurfactant contains about three to about 16 carbon atoms.

9. The micellar dispersion of claim 1 additionally containing from about 0.01 to about 4 percent by weight of an electrolyte.

10. The micellar dispersion of claim 1 additionally containing an extreme pressure agent.

11. The micellar dispersion of claim 1 additionally containing a corrosion-inhibiting agent.

12. The micellar dispersion of claim 1 additionally containing an oxidation-inhibiting agent.

* * * * *